Feb. 16, 1965    R. A. BERGLUND    3,169,725
ERECTABLE MODULAR SPACE STATION
Filed May 24, 1962    3 Sheets-Sheet 1
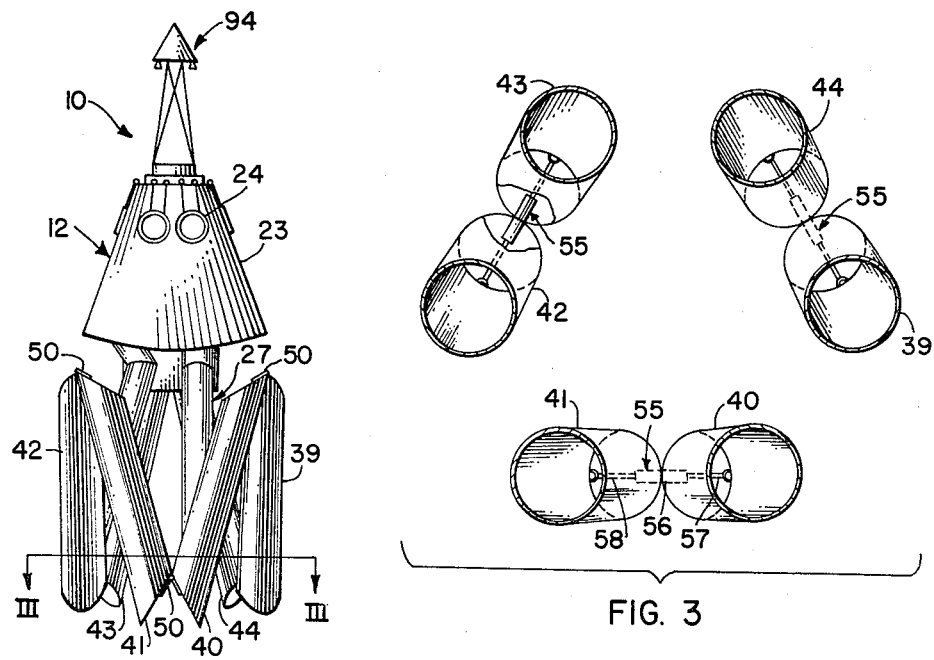
FIG. 2
FIG. 3
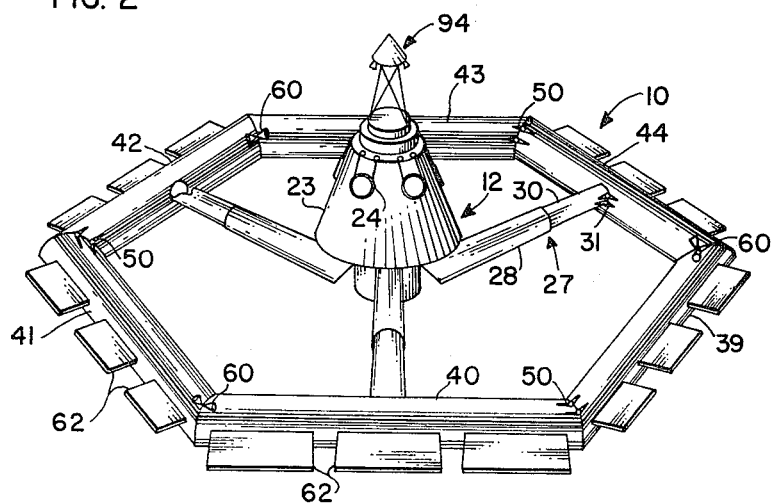
FIG. 1
INVENTOR
RENE A. BERGLUND
BY
ATTORNEY Feb. 16, 1965    R. A. BERGLUND    3,169,725
ERECTABLE MODULAR SPACE STATION
Filed May 24, 1962    3 Sheets-Sheet 2

INVENTOR
RENE A. BERGLUND

BY

ATTORNEY

Feb. 16, 1965   R. A. BERGLUND   3,169,725
ERECTABLE MODULAR SPACE STATION
Filed May 24, 1962   3 Sheets-Sheet 3
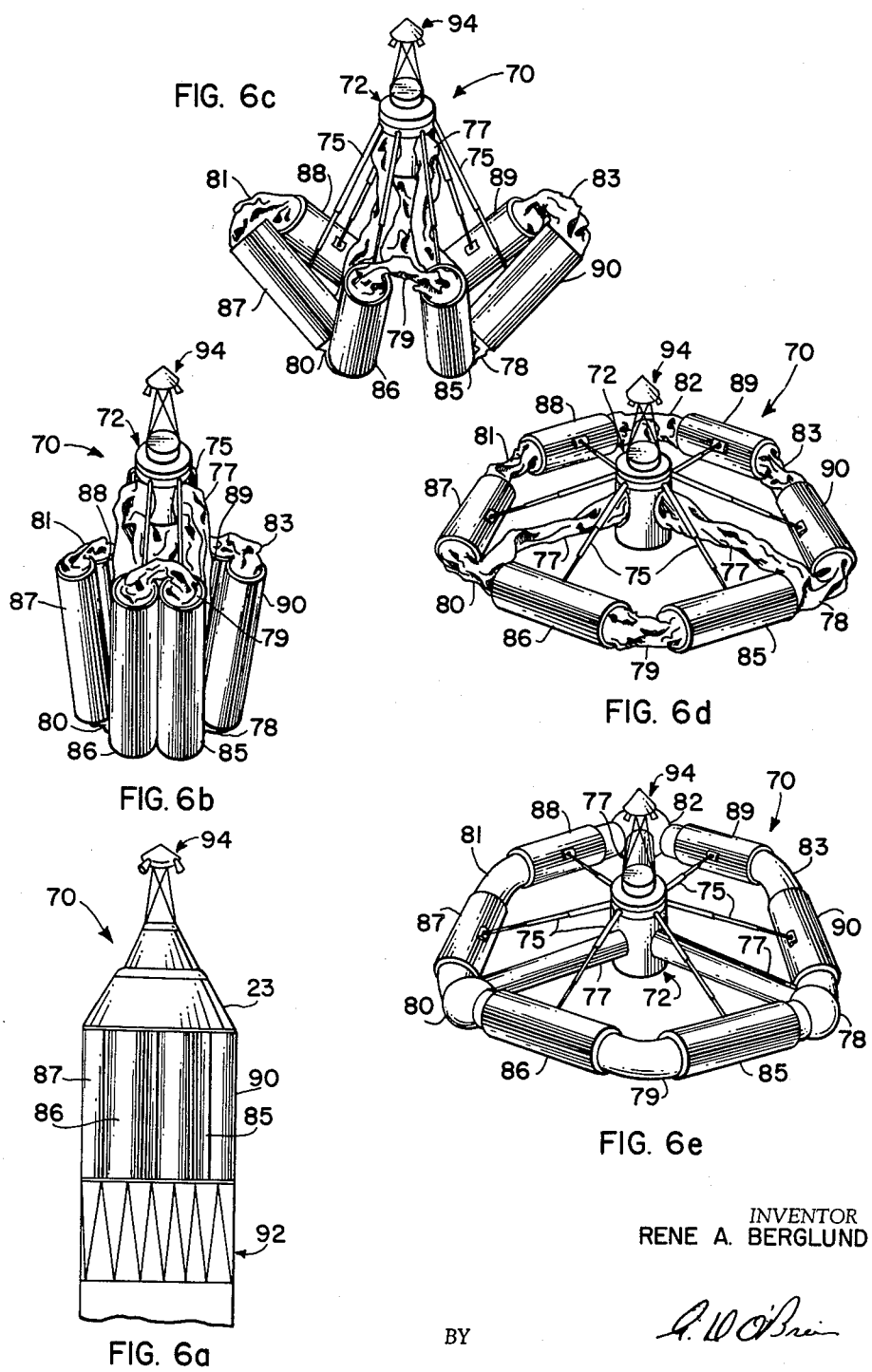
INVENTOR
RENE A. BERGLUND
BY
ATTORNEY

United States Patent Office 3,169,725
Patented Feb. 16, 1965

1

3,169,725
ERECTABLE MODULAR SPACE STATION
Rene A. Berglund, Newport News, Va., assignor to the
United States of America as represented by the Administrator of the National Aeronautics and Space Administration
Filed May 24, 1962, Ser. No. 197,551
15 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to a planetary orbital space station or space laboratory, and more particularly to a manned space station having rigid living compartments capable of being completely collapsed and stored in the payload stage of the multistage launch vehicle, launched into a planetary orbit, and which is self-erecting into an operating configuration.

Previous methods have been suggested for providing space stations in orbit about the earth or other planets. One technique suggested is that of placing a number of small units in orbit and assembling them to form the space station. Although this manner of forming a space station is feasible, it represents many problems. The major problem in this technique is that of rendezvous of the various units placed in orbit. Another problem is that of actual assembly of the various units in space.

Due to the difficulties in the above suggested technique, the method has been proposed to use inflatable structures which may be collapsed to facilitate placing the structure in space and thereafter erected to form the space station. This arrangement is superior to that heretofore suggested; however, has certain disadvantages. The major disadvantage of the inflatable type space station is that it requires in orbit installation of systems and fixed equipment. This is true, since such items are not generally amendable to inflatable or expandable design techniques. Another problem encountered with the inflatable structure is that of micrometeoroid penetration. Since inflatable material must be flexible, it cannot be designed to have strength to withstand micrometeoroid penetration. This requires structure for compartmentalizing the space station as well as provisions for sealing leaks due to penetration.

The ideal space station design would be to have a constructed rigid space station in which equipment and other systems could be installed before launch and the necessary design factors built in. The rigid body space station should also be sufficiently large (i.e., mass and volume) to allow for gravity simulation at low rotational speeds. To date, such a constructed structure is not feasible due to the limited capability of boosters to place such a structure in orbit.

The present invention overcomes many of the above problems by combining the best features of the inflatable body concept and the constructed rigid-body idea. The present invention provides the compactness of inflatable expandable designs and the prelaunch equipment installation features of the rigid design system. This is accomplished by utilizing rigid cylindrical sections (equipped for life support and experiments before launch) joined together by flexible connectors. These sections are connected to a central hub and are erectable to form a rigid hexagonal, tubular ring thereabout upon reaching the desired orbit. Existing booster facilities will allow the placing of such a station in orbit which would have a diameter of from 100 to 150 feet providing the necessary mass and volume to easily produce artificial gravity. The rigid compartment also can be designed to have strength properties that will withstand the micrometeoroid menace.

In view of the above, it is an object of this invention to provide a space station having rigid compartments which are foldable to facilitate launch into space and thereafter erectable to form a space station.

Another object of this invention is to provide a space station which has rigid sections which are capable of being fully equipped with life support fixtures prior to launch.

Yet another object to this invention is to provide a space station having foldable rigid sections erectable in space into a station with sufficient mass and volume to facilitate the provisions of artificial gravity.

Still another object of the invention is to provide a space station with rigid cylindrical sections having foldable connection means to facilitate erection in space.

Another object of this invention is to provide a space station having rigid cylindrical sections equipped with solar cells to provide a source of energy for occupants of the space station.

Yet another object of this invention is to provide a space station with mechanism for automatically erecting the space station upon attaining a desired orbit.

Still another object of this invention is to provide a space station having a hub section equipped to perform experiments under zero-gravity conditions.

These and other objects and advantages of this invention will become more apparent upon reading the specification in conjunction with the accompanying drawings.

In the drawings:

FIG. 1 is a perspective view of the preferred embodiment of the space station as it would appear in an erected position in space;

FIG. 2 is a partially expanded view of the space station of FIG. 1, showing the manner in which the rigid compartments are connected together;

FIG. 3 is a cross-sectional view taken along the section line III—III of FIG. 2;

Figure 4:
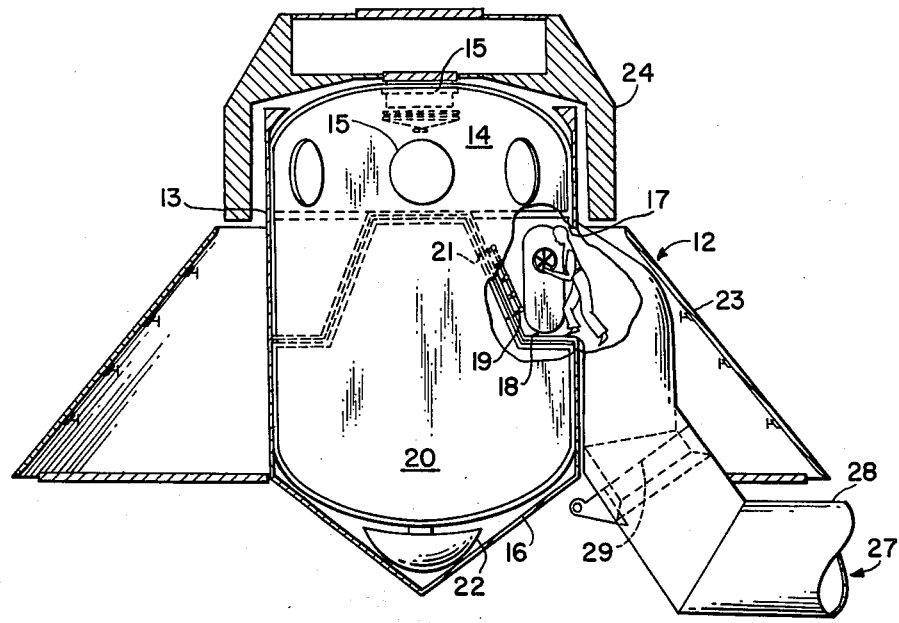
FIG. 4 is a side elevational view of the space station hub partially in section and partially cut away to reveal the interior of the hub.

FIGS. 6(a)–6(e) illustrates the sequence of events in launch, the packaged space station assembled to the booster, the initial opening phase, the semierected phase, the erected phase just before inflation, and the fully inflated or erected space station.

Basically, this invention relates to a space station which may be collapsed to facilitate launching and thereafter be erected into an operable structure. The space station includes a hub which is the nucleus of the station. The hub includes a zero-gravity (zero-g) laboratory which is mounted on an air-bearing fixed therein. The hub also includes structure for docking space vehicles to the space station. Radiating from the hub are access passages connected to the rigid sections or compartment which surround the hub and form the living quarters. The passages or access tubes are telescoping in nature and of rigid construction in the preferred embodiment. The rigid cylindrical compartments are hinged together at their ends. This arrangement facilitates the folding of the space station and allows the station to be erected into a structure wherein the six rigid cylindrical sections form a hexagonal-shaped tubular ring about the hub. The rigid compartments are fully equipped with life support necessities before launch of the space station. Hydraulic actuating mechanism is connected between each of the compartments and is operative to erect the space station.

In an alternate embodiment of the invention, the rigid compartments are connected to the hub section by a series of spoke-like telescoping struts. The compartments are inner-connected by inflatable, flexible material rather than by hinges. This arrangement also allows collapsing of the space station to facilitate folding into a compact unit for launch purposes. Access passages or tubes are constructed of the same material as the flexible connectors and are fastened to the hub and the flexible connectors to provide communication between the hub section and the rigid compartments. The telescoping struts have mechanism for extending them. They operate in conjunction with the release of air pressure to erect this form of the space station.

The preferred embodiment of the space station is designated generally by the reference numeral 10, and includes generally the hub 12, the access tubes 27, the living cells or compartments 39 through 44 and the actuator mechanism 55.

Referring now more specifically to the details of the invention, FIG. 1 illustrates the erected space station 10. Forming a part of the space station 10 is the hub section 12, also shown in FIG. 4 partially in cross-section. The body 13 of the hub is canister-shaped having a dome-shaped top 14 and an inverted pyramid-like base 16. The dome 14 is provided with docking hatches 15 which are positioned at equally spaced intervals about the circumference of the hub. A docking hatch 15 is also positioned in the apex of the dome 14 as shown in FIG. 4. The hub 12 also has a skirt-like portion including a deck 18 which is suspended from the dome 14 of the hub. Positioned at equally spaced intervals about the outer periphery of the deck 18 are openings 17. The openings 17 allow communication between the hub 12 and the access tubes 27 to be explained more fully hereinafter.

An air-bearing 22 (illustrated diagrammatically), located in the base 16, supports a zero-gravity (zero-$g$) laboratory 20 within the hub body 13. The air-bearing 22 is of a conventional design such as illustrated in United States Patent No. 2,695,198. The zero-$g$ laboratory 20 is provided with an opening 21 to allow access from the hub to the laboratory.

The deck 18 has a door 19 (FIG. 3) which is alined with the opening in zero-$g$ laboratory 20. The door provides means whereby the zero-$g$ laboratory may be sealed from the other portions of the hub body 13.

Surrounding the lower portion of hub body 13 is fairing 23 (FIG. 4). The fairing 23 is of shell-like construction, and of a frustro-conical design to improve the aerodynamic properties of the space station during launch.

A docking ramp 24 is fixed to the hub dome 14 and is utilized to receive space vehicles. The docking ramp 24 is operative to connect a space vehicle to the docking hatches 15.

The access tubes 27 are shown inter-connected between the hub 12 and certain of the living compartments 39–44 as shown in FIG. 1. The access tubes 27 are telescoping members having an inner-access tube 28 which connect to the openings 17 of the hub. Each inner-access tube 28 has a coupling 29 which allows rotation and straightening of the tube to facilitate collapsing the space station.

The outer-access tubes 30 are slidably disposed at one end within the inner-access tubes 28, and are hinged at the other end to the respective rigid living cells 40, 42, and 44. FIG. 1 shows hinge arrangement 31 which is utilized to connect the outer-access tube 30 to the living cell 44. Each of the other outer-access tubes are hinged to the living cells in a similar manner. The hinge arrangement facilitates the collapse of the space station for launch purposes, as well as the telescoping relationship of the outer-access tube with respect to the inner-access tube.

The living cells 39, 40, 41, 42, 43, and 44 are arranged in a hexagonal pattern about the hub 12 as shown in FIG. 1. The living cells 40, 42, and 44 have openings (shown at one point in FIG. 1 by a partially cut away outer-access tube) which receive the open ends of the outer-access tubes 30. It is thus clear, that the astronaut is able to move from the living cells through the access tubes into the hub section.

The living compartments 39–44 are connected together at their respective ends by hinges 50. The hinges 50 are positioned alternately at the top and bottom of each juncture between the ends of the living compartment as is best illustrated in FIGS. 1 and 2. This allows the rigid living cells to collapse in an accordian-like fashion into a cylindrical arrangement basically similar to that shown in FIG. 6a.

As shown in FIG. 3, actuators designated generally at 55, are connected between the ends of the various living cells. The actuators 55 include a power cylinder 56, which may be pneumatic or hydraulic, with takeup rods 57 and 58. For purposes of illustration, the rod 57 is shown connected to the living cell 40 and the rod 58 connected to the living cell 41. When the cylinder 56 is energized, in a conventional manner, the rods 57 and 58 are withdrawn and bring together the ends of the living cells 40 and 41 into juxtaposition as shown in FIG. 1.

Spin and despin rockets 60 are located on the living cells of 39–44 as shown in FIG. 1. These rockets are of a conventional reaction type and are utilized to spin the space station to create artificial gravity. Since the rockets have a double-ended nozzle, they can also be used to despin the rocket and thereby terminate the spin function, or spin the space station in the reverse direction.

The living compartments are also provided with a series of solar cells 62. The solar cells 62 are utilized to gather energy from the sun which is utilized by a solar conversion unit. The solar cells 62 are shown extended in FIG. 1; however, may be folded against the living cells during launch or retracted therein as the design criteria permits.

Figure 5:
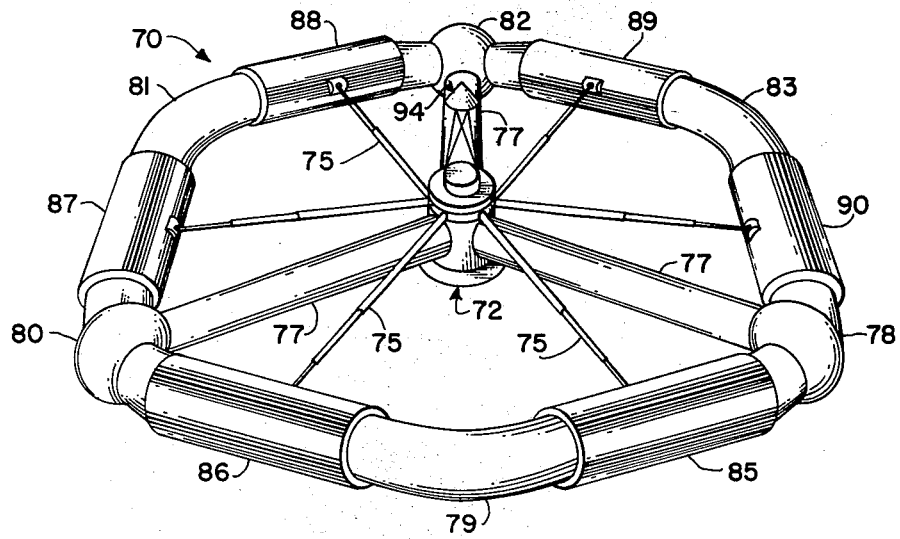
FIG. 5 is a perspective view showing another embodiment of an erected space station.

An alternate embodiment of the invention is shown in FIG. 5, and is designated generally by the reference numeral 70.

The space station 70 is basically similar in design to that of the space station 10 and has a hub section 72 which may be essentially identical to that of hub 12. In view of the similarity between the hubs 12 and 72, further description of the hub 72 is believed unnecessary.

The space station 70 differs in that telescoping struts 75 are connected to the hub 72 and project radially outward therefrom in a spoke-like fashion. The outer extremeties or the struts 75 are connected to rigid living compartments or cells 85–89.

The living cells 85–90 are inter-connected by flexible connectors 79–83. The flexible connector 79 joins living cells 85 and 86, the connector 80 joins living cells 86 and 87, the connector 81 joins living cells 87 and 88, the collector 82 joins living cells 88 and 89, the connector 83 joins living cells 89 and 90, and the connector 78 joins living cells 90 and 85. The connectors 78, 80, and 82 have a ring-like central portion which receive the outer ends of flexible access passages 77. The inner ends of the flexible access passages 77 are fixed to the hub 72. The flexible connectors 78 and the flexible access passages 77 provide an arrangement whereby the space station may be folded to facilitate launch as shown in FIGS. 6a and 6b.

The struts 75 may be provided with mechanical extension apparatus of conventional design, such as an hydraulic actuator, to deploy the rigid living compartments from the central hub section. Fluid pressure from cells (not shown) stored within the living compartments may be released to inflate the flexible connectors and access passages.

Although not shown, it is to be understood that within the broadest aspect of the invention the space station 70 may be provided with rockets and solar cells similar to those used on the space station 10.

FIG. 6a shows partially a booster 92 which may be used to launch the space station 10 or 70. A space vehicle 94 is shown attached to the dome of the space station 70 and may be occupied during launch; however, the space vehicle 94 may be replaced with a nose cone and the space vehicle dock to the space station after it has attained orbit, the nose cone having previously been jettisoned.

Operation

The operation of the space station, particularly the operation of the erection phase of the space station, is best illustrated by the sequence shown in FIGS. 6a–6e. This sequence illustrates the deployment of the space station 70; however, it is to be understood that the deployment of the space station 10 would be similar with minor exceptions which will be explained hereinafter.

FIG. 6a shows the space station in a collapsed position and connected to the booster 92. A space vehicle 94 is shown fixed to the dome of the space station 70. Assuming no malfunctions during launch, the combination retains the configuration of essentially that of 6a until an orbit is attained. Thereafter the space station 70 is jettisoned from the booster 92 in a conventional manner. If a nose cone is utilized rather than a space vehicle 94, it also is jettisoned. FIG. 6b shows the initial deployment or erection stage wherein the living compartments 85–90 are beginning to separate. This separation is brought about as a result of the extension of telescoping struts 75.

As previously explained, telescoping struts 75 are provided with some means for extending them to facilitate erection of the space station. FIG. 6c shows an intermediate stage of assembly, and FIG. 6d shows the struts 75 fully extended. At this point, the fluid pressure stored within the space station is released and the flexible connectors 78–83 and flexible access passages 79 are inflated providing the final configuration of the space station as shown in FIG. 6e. This also provides the proper pressurization within the space station.

The space station 10 is erected by energization of the actuators 55. The takeup rods 57 and 58 connected between each of the living cells are withdrawn by the cylinders 56 and bring the ends of the living cells together. FIG. 2 shows an intermediate phase of the erection of space station 10 and FIG. 1 shows the station fully erected. Due to the design of the space station 10, the access tubes 27 automatically extend upon the operation of the actuators 55. Since the living compartments are directly hinged together, it is not necessary to use the flexible connector arrangement of the space station 70 embodiment. It also becomes apparent, that in the space station 10 embodiment, the release of fluid pressure to erect the space structure is unnecessary although it may be used for station pressurization.

The rockets 60 are energized to spin the space stations 10 or 70 to provide artificial gravity in the living compartments. Since the space station has a diameter from 100 to 150 feet, the bulk of which is disposed from the hub, the station will continue to spin with only intermittent use of the rockets 60. The rockets 60 may also be used to despin the space station or change its direction.

Under normal operation the space station is spinning to create artificial gravity or earth environment. This prohibits the performance of space experiments within the living compartments. In order to conduct space experiments, the zero-g laboratory remains stationary with respect to the remainder of the space station made possible by the air-bearing 22. Pulse type reaction jets or other techniques may be utilized to despin the hub or respin it as necessary. The spin of the space station is thereby neutralized and the zero-g laboratory is as if it were freely suspended in space. The space man has access to the zero-g laboratory through the access tubes 27 and the deck doors 19 as shown in FIG. 4.

If an occupied space vehicle 94 is launched with the station, upon erection of the space station the space man gains access thereto through the hatch 15. Otherwise, the space vehicle 94 thereafter attaches to the docking ramp 24 and gains access through one of the hatches 15.

From the above description, the many advantages of the instant invention over existing structures becomes readily apparent. With the rigid construction of the living cells or compartment, the fear of micrometeoroid penetration is virtually eliminated. This was a particular problem in the previous inflatable space station designs. The use of the rigid living compartments also provides a large mass about the hub section and makes it easy to generate a source of artificial gravity. Due to the novel manner in which the rigid living compartments are connected together, the space station can be collapsed into a compact unit easily adapted to a launch vehicle for placing the structure in space. Thereafter, the space station is readily erectable by the use of simply designed, light-weight, mechanical actuating equipment. This invention further overcomes the problems inherent in the assembly of a number of smaller units which might be launched into orbit either collectively or individually. Since the living compartments are rigid, they may be fully equipped with life support necessities before launch.

It is to be understood that the foregoing disclosure relates only to preferred embodiments of the invention, and that numerous modifications and variations of the present invention are possible in the light of the above teachings, without departure from the spirit and the scope of the invention, as set forth in the appended claims.

I claim:

1. A space station capable of being disposed as the payload of a launch vehicle and thereby launched from a planetary surface into an extraplanetary spatial vacuum for operation therein carrying living occupants comprising: a system collapsible before launch and to facilitate launch; means for simultaneously erecting rigid living components of said collapsible system to form a space station after launch, said space station having hub means; access means connected to said hub means; and contiguous rigid living compartments comprising components of said system circumscribing said hub means and communicating with said access means.

2. A space station capable of being disposed as the payload of a launch vehicle and thereby launched from a planetary surface into an extraplanetary spatial vacuum for operation therein carrying living occupants as in claim 1 wherein said erection means includes extendable struts means and pressurization means.

3. A space station capable of being disposed as the payload of a launch vehicle and thereby launched from a planetary surface into an extraplanetary spatial vacuum for operation therein carrying living occupants as in claim 1 wherein said erection means includes power actuating means connected between said compartments.

4. A space station capable of being disposed as the payload of a launch vehicle and thereby launched from a planetary surface into an extraplanetary spatial vacuum for operation therein carrying living occupants as in claim 1 wherein said hub means includes zero-g laboratory means, and air bearing means for suspending said zero-g laboratory within said hub means.

5. A space station capable of being disposed as the payload of a launch vehicle and thereby launched from a planetary surface into an extraplanetary spatial vacuum for operation therein carrying living occupants as in claim 1 wherein said living compartments are equipped with foldable solar cells to provide a source of energy for said compartment.

6. A space station capable of being disposed as the payload of a launch vehicle and thereby launched from a planetary surface into an extraplanetary spatial vacuum for operation therein carrying living occupants as in claim 1 where said living compartments are connected by hinge structure.

7. A space station capable of being disposed as the payload of a launch vehicle and thereby launched from a planetary surface into an extraplanetary spatial vacuum for operation therein carrying living occupants as in claim 1 where said living compartments are connected by inflatable material.

8. A space station capable of being disposed as the payload of a launch vehicle and thereby launched from a planetary surface into an extraplanetary spatial vacuum for operation therein carrying living occupants comprising: a foldable system, said foldable system including a hub section, telescoping access tubes connected to said hub section; living compartments surrounding said hub section and communicating with said telescoping access tubes; said living compartments being hinged at their respective ends alternately at opposite sides to facilitate folding; and actuator means connected between said living compartment operable to bring said living compartment ends into an abutting relationship thereby erecting said foldable system into a space station.

9. A space station capable of being disposed as the payload of a launch vehicle and thereby launched from a planetary surface into an extraplanetary spatial vacuum for operation therein carrying living occupants as in claim 8 wherein said actuator means connected between said living compartments are fluid power cylinders; said fluid power cylinders having arms one each of which are connected to adjacent living compartments whereby upon actuation of said fluid power cylinders retraction of side arms draw said living compartment ends into abutting relationship.

10. A space station capable of being disposed as the payload of a launch vehicle and thereby launched from a planetary surface into an extraplanetary spatial vacuum for operation therein carrying living occupants comprising; a foldable system, said foldable system including hub means; rigid living compartment means displaced from and surrounding said hub means, said rigid living compartment means having sections, foldable means joining said sections to facilitate collapse and erection of said space station, flexible access passages communicating with said hub means and said rigid living compartment means; telescoping struts fastened at one end to said sections and at the other end to said hub means, said telescoping struts including means for extending them to open said foldable system; and pressure means for inflating said foldable means and access passages to assist said telescoping struts in erecting aid foldable system into a space station.

11. A space station comprising: hub means, rigid living compartment means displaced from and surrounding said hub means, and passage means connecting said hub means and said rigid living compartment means; said rigid living compartment means including sections; and foldable means joining said sections to facilitate collapse and erection of said space station as a complete unit.

12. A space station comprising: hub means, rigid living compartment means displaced from and surrounding said hub means, and passage means connecting said hub means and said rigid living compartment means; said rigid living compartment means including sections; and hinge means joining said sections to facilitate collapse and erection of said space station.

13. A space station capable of being disposed as the payload of a launch vehicle and thereby launched from a planetary surface into an extraplanetary spatial vacuum for operation therein carrying living occupants comprising: a foldable system; said foldable system including a hub section, said hub section having a zero-g laboratory rotatable relative to said hub section, an air bearing supporting said zero-g laboratory within said hub section; space vehicle docking means forming a part of said hub section; telescoping access tubes connected to said hub section; living compartments surrounding said hub section and communicating with said telescoping access tubes; said living compartments being hinged at their respective ends alternately at opposite sides to facilitate folding; actuator means connected between said living compartments operable to bring said living compartment ends into an abutting relationship thereby erecting said foldable system into a space station, rocket means fixed to the periphery of said space station to spin said space station to provide artificial gravity; and solar cells attached to said living compartments to provide a source of energy for occupants of said living compartments.

14. A space station capable of being disposed as the payload of a launch vehicle and thereby launched from a planetary surface into an extraplanetary spatial vacuum for operation therein carrying living occupants comprising: a foldable system; said foldable system including hub means; said hub means having a zero-g laboratory rotatable relative to said hub means, an air bearing supporting said zero-g laboratory within said hub means; docking means forming a part of said hub section for docking a space vehicle; rigid living compartment means displaced from and surrounding said hub means, said rigid living compartment means having sections, foldable means joining said sections to facilitate collapse and erection of said space station, flexible access passages communicating with said hub section and said rigid living compartment means; telescoping struts fastened at one end to said rigid living compartments and at the other end to said hub means, said telescoping struts including means for extending them to open said foldable system, pressure means for inflating said foldable means and access passages to assist said telescoping struts in erecting said foldable system into a space station; rocket means fixed to the periphery of said space station to spin said space station and thereby provide artificial gravity; and solar cells attached to said living compartment means to provide a source of energy for occupants of said living compartment means.

15. The method of placing a rigid space station into an extraplanetary vacuum for operation therein comprising the steps of: joining rigid space station compartments; folding said rigid space compartments into a compact unit; launching said compact unit into orbit; and simultaneously erecting said unit compartments into a space station upon obtaining the desired orbit.

References Cited by the Examiner

Project Satellite, K. W. Gatland, London, February 1958, see pp. 123, 124 and FIGURES 27, 28.

Advances in Astronautical Sciences (proceedings of the fifth annual meeting of the ASS, November 1958), N.Y., see pages 154, 156, 161, 162 and 170–172.

IAS Publication of the 1960 Manned Space Station Symposium: "Inflatable Manned Orbital Vehicles," by Carter and Bogen of Martin-Baltimore, pages 188–196.

FERGUS S. MIDDLETON, *Primary Examiner.*

MILTON BULCHLER, R. DAVID BLAKESLEE,
*Examiners.*

UNITED STATES PATENT OFFICE
CERTIFICATE OF CORRECTION

Patent No. 3,169,725                           February 16, 1965

Rene A. Berglund

It is hereby certified that error appears in the above numbered patent requiring correction and that the said Letters Patent should read as corrected below.

Column 1, line 40, for "amendable" read -- amenable --; column 3, line 44, after "opening" insert -- 21 --; column 4, line 16, for "at" read -- as --; line 58, for "collector 82" read -- connector 82 --; column 7, line 52, for "aid" read -- said --.

Signed and sealed this 20th day of July 1965.

(SEAL)
Attest:

ERNEST W. SWIDER                               EDWARD J. BRENNER
Attesting Officer                                    Commissioner of Patents